United States Patent
DeVlieg et al.

(10) Patent No.: US 7,789,469 B2
(45) Date of Patent: *Sep. 7, 2010

(54) METHOD AND SYSTEM TO INCREASE ELECTRIC BRAKE CLAMPING FORCE ACCURACY

(75) Inventors: Gary DeVlieg, Bellevue, WA (US); John Gowan, Edmonds, WA (US)

(73) Assignee: Hydro-Aire, Inc., Burbank, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/039,603

(22) Filed: Feb. 29, 2008

(65) Prior Publication Data

US 2009/0001806 A1 Jan. 1, 2009

Related U.S. Application Data

(63) Continuation of application No. 11/337,097, filed on Jan. 19, 2006, now Pat. No. 7,410,224.

(51) Int. Cl.
*F16D 55/36* (2006.01)

(52) U.S. Cl. .................. 303/3; 188/1.11 E; 244/111

(58) Field of Classification Search ............. 188/1.11 E, 188/1.11 R, 1.11 L, 158, 162; 244/110 A, 244/111; 303/20, 126, 3
See application file for complete search history.

(56) References Cited

U.S. PATENT DOCUMENTS

| | | | |
|---|---|---|---|
| 3,920,282 A | 11/1975 | DeVlieg | |
| 3,948,569 A | 4/1976 | Genter et al. | |
| 4,043,607 A | 8/1977 | Signorelli et al. | |
| 4,234,063 A | 11/1980 | Blake | |
| 4,364,610 A * | 12/1982 | Williams | 303/36 |
| 4,367,529 A | 1/1983 | Masclet et al. | |
| 4,610,484 A | 9/1986 | Amberg et al. | |
| 4,613,190 A | 9/1986 | Johnson | |
| 4,923,056 A | 5/1990 | Nedelk | |
| 4,986,610 A * | 1/1991 | Beck et al. | 303/176 |
| 4,995,483 A | 2/1991 | Moseley et al. | |
| 5,024,491 A | 6/1991 | Pease, Jr. et al. | |
| 5,050,940 A | 9/1991 | Bedford et al. | |
| 5,172,960 A | 12/1992 | Chareire | |
| 5,217,282 A | 6/1993 | Guichard | |
| 5,417,477 A | 5/1995 | Lasbleis | |
| 5,505,531 A | 4/1996 | Griffith et al. | |

(Continued)

FOREIGN PATENT DOCUMENTS

EP 0 329 373 A1 8/1989

(Continued)

*Primary Examiner*—Christopher P Schwartz
(74) *Attorney, Agent, or Firm*—Fulwider Patton LLP

(57) ABSTRACT

The method and system for increasing accuracy of clamping force of electric aircraft carbon brakes, once braking has been commenced, provides a first pair of electric brake actuators with a range of low brake clamping force responsive to low brake clamping force commands, and a second pair of electric brake actuators with a range of high brake clamping force responsive to high brake clamping force commands. The first pair of electric brake actuators is actuated to apply a minimum residual braking force once wheel braking is commenced, and the second pair of electric brake actuators is actuated only when the commanded braking force is in the high range of brake clamping force.

15 Claims, 3 Drawing Sheets

U.S. PATENT DOCUMENTS

| | | |
|---|---|---|
| 5,845,975 A | 12/1998 | Wells |
| 6,036,285 A | 3/2000 | Murphy |
| 6,398,162 B1 | 6/2002 | Stimson et al. |
| 6,478,252 B1 * | 11/2002 | Stimson et al. ............. 244/111 |
| 6,604,708 B1 | 8/2003 | DeVlieg |
| 6,659,233 B2 | 12/2003 | DeVlieg |
| 6,722,745 B2 | 4/2004 | Salamat et al. |
| 6,851,649 B1 | 2/2005 | Radford |
| 7,410,224 B2 * | 8/2008 | DeVlieg et al. ............. 303/126 |
| 7,441,844 B2 * | 10/2008 | DeVlieg et al. ............. 303/126 |
| 7,506,730 B2 * | 3/2009 | Strandberg et al. ........ 188/18 A |
| 2004/0011596 A1 | 1/2004 | Miller et al. |
| 2005/0082999 A1 | 4/2005 | Ether |
| 2005/0104446 A1 | 5/2005 | Chico et al. |
| 2005/0231030 A1 | 10/2005 | Frank |
| 2005/0269872 A1 | 12/2005 | Ralea |
| 2006/0175897 A1 * | 8/2006 | Ether ........................ 303/138 |

FOREIGN PATENT DOCUMENTS

| | | |
|---|---|---|
| EP | 0 384 071 A1 | 8/1990 |
| EP | 0 443 213 A2 | 8/1991 |

\* cited by examiner ions of the present invention will become more apparent from the following detailed description of the preferred embodiments in conjunction with the accompanying drawings, which illustrate, by way of example, the operation of the invention.

METHOD AND SYSTEM TO INCREASE ELECTRIC BRAKE CLAMPING FORCE ACCURACY

CROSS-REFERENCES TO RELATED APPLICATIONS

This application is a continuation of application Ser. No. 11/337,097, filed 19 Jan. 2006, now U.S. Pat. No. 7,410,224, which is related to application Ser. No. 11/061,375, filed 18 Feb. 2005, which is incorporated by reference herein.

BACKGROUND OF THE INVENTION

This invention relates to a method and system for increasing accuracy of clamping force of electric brakes of aircraft, and more particularly relates to a method and system for increasing accuracy of clamping force of electric aircraft carbon brakes providing greater accuracy for low brake clamping force commands by dedicating a portion of a plurality of electric brake actuators of each brake to low brake clamping force commands, without otherwise affecting normal braking.

Commercial aircraft commonly have landing gear with electrically actuated brakes for wheels mounted to the wing and body of the aircraft. The electrically actuated brakes are typically carbon brakes including a torque plate and a carbon heat sink stack containing the friction surfaces that are clamped together by four electric brake actuators with a clamping brake force to cause a wheel to decrease its speed of rotation. In such a conventional airplane carbon brake system, when braking is commanded, either by a pilot's actuation of a brake pedal or automatic braking, it causes the friction surfaces of the carbon brakes to make contact, creating brake torque to slow down the rotational speed of the wheel, and through contact with the ground, the taxi speed of airplane.

As is described in application Ser. No. 11/061,375, it is possible to reduce brake wear of electrically operated aircraft carbon brakes, once braking has been commenced, by maintaining a minimum light residual clamping brake force when braking is no longer commanded, such as when a pilot stops pressing on a brake pedal, or otherwise during a commanded release of braking during automatic braking. During taxiing of commercial aircraft, particularly at low speeds, steering of the aircraft is typically controlled by braking, and an unequal distribution of brake energy due to inaccurate metering of brake clamping force can in some instances interfere with the directional stability of aircraft, particularly when a minimum light residual clamping brake force is maintained during taxiing when braking is no longer commanded. Unequal distribution of brake energy due to inaccurate metering of brake clamping force can also result in damage to wheels and brakes from exposure to excessively high temperatures. It has been found that it is not possible with currently available electrical braking systems to achieve a brake clamping force accuracy required by current industry standards for the Boeing 787, and to prevent unequal distribution of brake energy. What is therefore needed is a method and system for providing greater sensitivity to brake commands, particularly at low brake clamping force levels, without otherwise affecting normal braking. The present invention satisfies this and other needs.

SUMMARY OF THE INVENTION

Briefly, and in general terms, the present invention provides for a method and system for increasing accuracy of clamping force of electric aircraft carbon brakes, once braking has been commenced, by providing a first portion of electric brake actuators of each brake with a range of low brake clamping force responsive to low brake clamping force commands, and a second portion of electric brake actuators of each brake with a range of high brake clamping force responsive to high brake clamping force commands, and actuating the first portion of electric brake actuators with a range of low brake clamping force when the commanded braking force is in the low range of brake clamping force, and actuating the second portion of electric brake actuators with a range of high brake clamping force when the commanded braking force is in the high range of brake clamping force. The method and system of the invention provide electric brake actuation with greater accuracy and sensitivity to brake commands, particularly at low taxiing speeds requiring low brake clamping force levels, without otherwise affecting normal braking.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
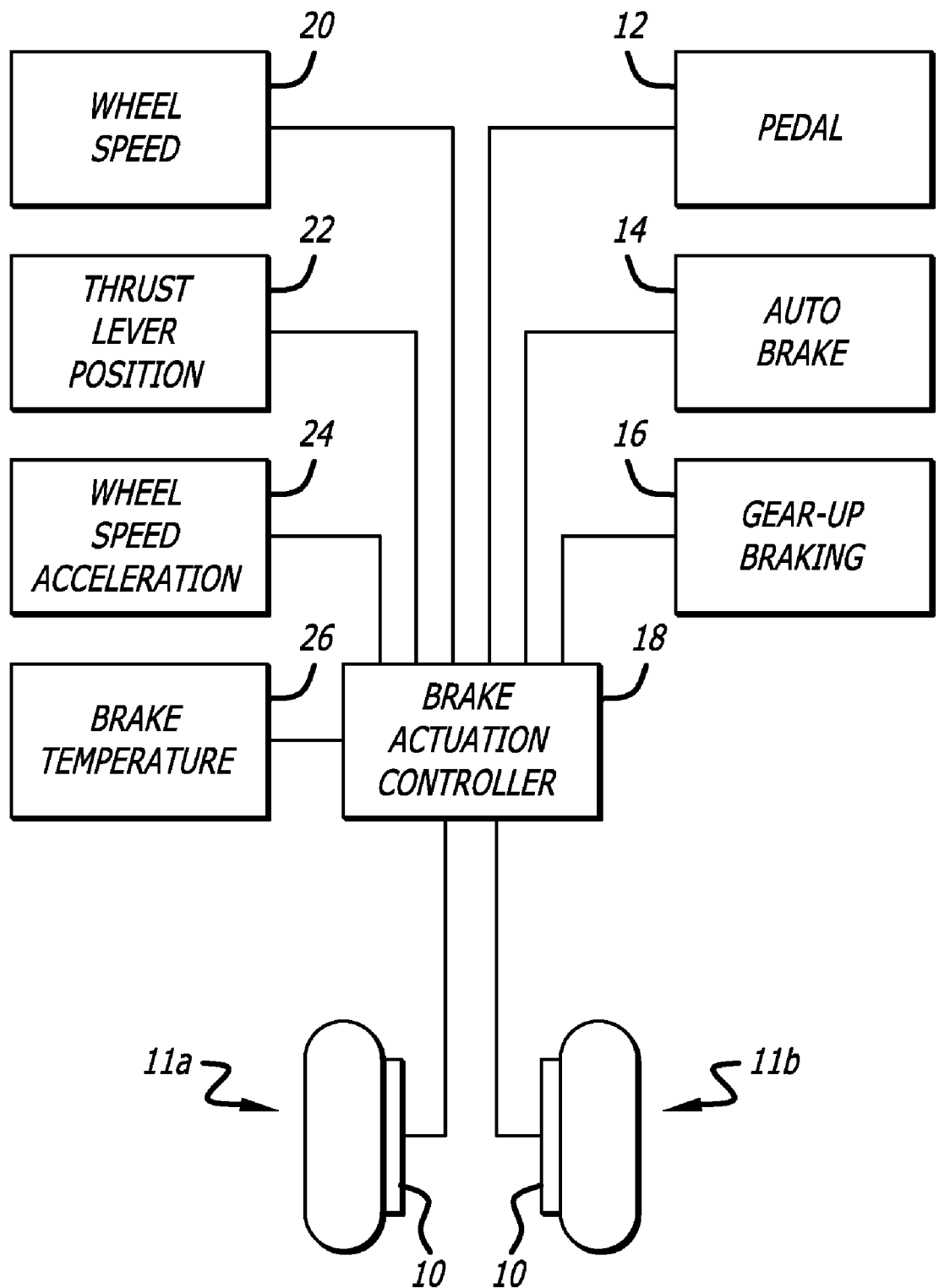
FIG. 1 is a schematic diagram of a system for controlling electric brakes of an aircraft, according to the present invention.

While it is possible to reduce brake wear of electrically operated aircraft carbon brakes, once braking has been commenced, by maintaining a minimum light residual clamping brake force when braking is no longer commanded during taxiing of commercial aircraft, particularly at low speeds, unequal distribution of brake energy due to inaccuracy of brake clamping force can interfere with the directional stability of aircraft, and can result in damage to wheels and brakes from exposure to excessively high temperatures.

Referring to the drawings, which are provided for purposes of illustration and by way of example, the present invention accordingly provides for a method and system for controlling electrically operated aircraft brakes of an aircraft having a plurality of wheels and a corresponding plurality of wheel brakes for the plurality of wheels to increase accuracy of clamping force of electric aircraft brakes providing greater accuracy for low brake clamping force commands by dedicating a portion of a plurality of electric brake actuators of each brake to low brake clamping force commands, preventing an unequal distribution of brake clamping force without otherwise affecting normal braking, such as when the aircraft is taxiing.

As is illustrated in FIG. 1, according to the method and system of the invention, the commanded initiation of braking of any of the plurality of wheel brakes 10 of an aircraft, such as by actuation of brake pedal 12 by a pilot, an autobrake system 14, or gear-up braking system 16, for example, is monitored by a brake actuation controller 18, and a residual brake clamping force is set to a predetermined minimum residual brake clamping force by the brake actuation controller to keep the brakes engaged and provide a slight drag for the plurality of wheel brakes following the commanded initiation of braking. The predetermined minimum residual brake clamping force is typically set to about 1 to 0% of the maximum brake clamping force of the brake, and in a currently preferred aspect, is set to about 2 to 5 percent of the maximum brake clamping force of the brake.

Figure 2:
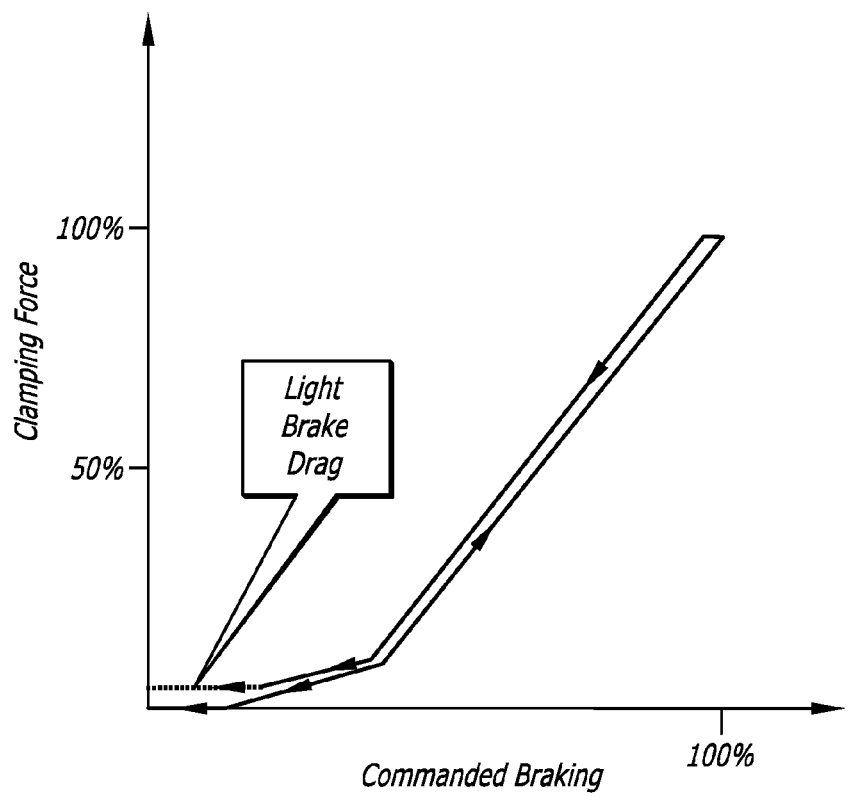
FIG. 2 is a graph illustrating the application of brake clamping force vs. commanded brake application according to the present invention.

Once the residual minimum brake clamping force is engaged, it is maintained for the plurality of wheel brakes despite a commanded release of braking, such as by actuation of brake pedal by a pilot or an autobrake system, for example, of any of the plurality of wheel brakes. The application of the predetermined minimum residual brake clamping force is continued until one or more control logic conditions occurs, in response to which the application of the predetermined minimum residual brake clamping force is discontinued. In a preferred aspect, the predetermined minimum residual brake clamping force is discontinued by setting the residual brake clamping force to a "full dump" or substantially zero clamping force, so that the residual brake clamping force would continue to be a "full dump" or substantially zero clamping force until the brakes are applied again in the next commanded initiation of braking. As is illustrated in FIG. 2, application of the predetermined minimum residual brake clamping force is maintained after commanded release of braking results in a light brake drag during taxiing of an airplane.

Referring to FIG. 1, wheel speed monitors 20 for the wheels of the aircraft provide the wheel speed of the landing gear to the brake actuation controller, which determines the average wheel speed and compares the average wheel speed with a wheel speed threshold. A primary control logic condition under which the application of the predetermined minimum residual brake clamping force is discontinued occurs when the average wheel speed is below the predetermined wheel speed threshold, which in one presently preferred aspect is a wheel speed in a range of about 2 knots to about 10 knots, for example, in order to ensure full brake release during towing/push-back.

Typically when an aircraft has left landing gear 11a and right landing gear 11b, the average wheel speed of both the left and right landing gear may optionally be determined independently. The average wheel speeds of the left and right landing gear will be compared, and the lesser of the two average wheel speeds will be used to compare with the predetermined wheel speed threshold. The average wheel speed for each landing gear can be calculated independently in this manner so that when the airplane is turning and the inboard landing gear wheel speed is below the wheel speed threshold, the predetermined minimum residual brake clamping force will be discontinued.

In this control logic condition, when an aircraft has left and right landing gear, the predetermined minimum residual brake clamping force will be discontinued if the lesser of the two average wheel speeds is below the wheel speed threshold. The average wheel speed for each landing gear is calculated independently, so that when the airplane is turning and the inboard landing gear wheel speed is below the wheel speed threshold, the predetermined minimum residual brake clamping force will be discontinued. Disabling the brake drag force below a threshold will also ensure that the feature will not interfere with airplane towing operations, which typically happen at low speed. The brakes will also be fully released when the airplane is full stop. This will ensure that the brake drag will not interfere with parking brake operation, when maintenance personnel must replace the wheel/brake, during brake-released cooling on the ground, or during system checkout testing. Finally, disabling the brake drag force below a speed threshold will ensure that the brakes are released when stowed in the wheel well and prior to touchdown/wheel spinup.

A hysteresis can be incorporated into the wheel speed logic, such that once the wheel speed control logic condition has been met and the predetermined minimum residual brake clamping force has been discontinued, the predetermined minimum residual brake clamping force would not be applied upon the next commanded initiation of braking unless the aircraft first reaches a higher ground speed, such as 15 knots, for example, but the aircraft would again discontinue the predetermined minimum residual brake clamping force when the aircraft average wheel speed is below a lower speed, such as 2 knots, for example.

Engine thrust lever position may optionally be monitored to determine the pilot's intent to accelerate the airplane for takeoff or to begin taxi. An engine thrust lever position monitor 22 detects when any engine thrust lever is in an "advanced" position. If the predetermined minimum residual brake clamping force has been applied, the predetermined minimum residual brake clamping force will be discontinued if an engine thrust lever is detected to be in an "advanced" position. Once thrust levers are not in an "advanced" state, residual brake drag will be enabled after the pilot has subsequently depressed the brake pedal.

When the thrust levers are applied for takeoff, the wheel speed acceleration is quite significant and can be easily detected to positively inhibit any brake drag during takeoff. Therefore, optionally, a wheel speed acceleration monitor 24 can be provided to detect acceleration of the airplane for takeoff or taxiing, and as an alternative to monitoring of engine thrust lever position. The brake actuation controller can compare the wheel speed acceleration with a predetermined acceleration threshold, and application of the predetermined minimum residual brake clamping force may be discontinued if wheel speed acceleration beyond the preset acceleration threshold.

The brake temperature monitor system 26 may also be used to provide brake temperature readings to the brake actuation controller to compare with a predetermined temperature threshold, so that the application of the predetermined minimum residual brake clamping force can optionally be discontinued if the brake temperature increases above the temperature threshold. This way the residual brake force will not cause the brake temperature to become too high. Once the brake temperature is above the temperature threshold, carbon brake wear is already reduced because carbon brake wear rates are known to be less at high temperature.

Another optional control logic condition under which the application of the predetermined minimum residual brake clamping force could be discontinued can occur if the distance the aircraft has rolled with a predetermined minimum residual brake drag applied has exceeded a distance threshold. The roll distance traveled can be determined by the brake actuation controller by using data from the wheel speed monitor and tracking the time since the last brake application command. Once the roll distance has increased above a set threshold, such as two miles, for example, the predetermined minimum residual brake clamping force will be discontinued to prevent the brakes from becoming hotter.

Examples of circumstances in which one or more of the control logic conditions should ideally apply to interrupt application of predetermined minimum residual brake application clamping force include: during towing and push-back, so that the tow tractor doesn't have to cope with the brake drag; during touchdown/wheel spinup; during antiskid cycling when full dumps are commanded; on the outboard gear during tight turns, since release of the residual drag may be desirable so that the brakes don't fight the turn; with the landing gear stowed, which may be desirable for cooling the landing gear in the wheel well; and when parked with the parking brake released, which also may be desirable for brake cooling. Typically for such circumstances as touchdown, spinup, and during antiskid cycling, an antiskid system already overrides metered braking pressure. While for tight turns it may also be desirable to optionally implement a steering control logic condition by monitoring steering or tiller position, this would normally not be necessary, since typically release of the predetermined minimum residual brake clamping force would already take place when any such tight turns might occur, due to the monitoring of wheel speed as a control logic condition. During turns, the speed of the wheels on the inboard side of the turn will travel more slowly than those on the outboard side, and the differential will become greater as the turn gets tighter. The effect of the wheel speed logic would be to remove the "slight drag" virtually any time the aircraft makes a tight turn, thereby reducing the differential thrust required to make the turn.

Although it is also possible to optionally monitor stowing of the landing gear and parking, due to monitoring of wheel speed, release of the predetermined minimum residual brake clamping force would normally take place when the landing gear is stowed or the airplane is parked, due to the control logic that releases the brakes below a wheel speed threshold. It should also be noted that brake release commands from an antiskid control system always override any brake application command, i.e. a full release from the antiskid control system will always result in full release of the brake application clamping force.

The result for various phases of operation is as follows:

Parked at the ramp: Brakes will fully release (wheel speed below 2 to 10 knots).

Pushback: Brakes will fully release (wheel speed below 2 to 10 knots).

Very slow taxi (below 2 to 10 knots): Brakes will fully release (wheel speed below 2 to 10 knots).

Normal taxi (above 2 to 10 knots): Brakes will fully release until first brake snub, and then brakes will gently "ride."

Tight turns: Brakes will fully release (tight turns require slow speed, inboard-gear wheel speed below 2 to 10 knots).

Takeoff roll:
  Normal operation: Brakes will fully release (thrust levers advanced).
  Abnormal operation: For RTO with sufficient braking to induce antiskid action, brakes will fully release until 1st brake application. Then brakes will fully release whenever antiskid commands it. If antiskid doesn't command full release then brakes will gently "ride".

Liftoff: Brakes will fully release (thrust levers advanced).

Gear retract: Brakes apply due to gear retract braking, then fully release when gear retract braking command is removed (wheel speed below 2 to 10 knots).

Stowage in wheel well: Brakes will fully release (wheel speed below 2 to 10 knots).

Gear extension before touchdown: Brakes will fully release (wheel speed below 2 to 10 knots).

Touchdown/spinup (pedals not applied).

Normal operation: Brakes will fully release (brakes not re-applied since wheel speed below 2 to 10 knots).

Abnormal operation: Touch down/spinup with pedals applied, brakes will fully release (touchdown/hydroplane protection already resident in antiskid).

Landing rollout, either manual or automatic braking (no antiskid action).

Normal operation: Brakes will fully release until 1st brake application. Then brakes will gently "ride."

Abnormal operation: Landing rollout with sufficient braking to induce antiskid action, brakes will fully release until 1st brake application. Then brakes will fully release whenever antiskid commands it. If antiskid doesn't command full release then brakes will gently "ride."

Taxi in (above 2 to 10 knots): Brakes will fully release until 1st brake snub. Then brakes will gently "ride."

Final maneuvering and docking (below 2 to 10 knots): Brakes will fully release (wheel speed below 2 to 10 knots).

Setting the parking brake, then releasing: Brakes will fully release (wheel speed below 2 to 10 knots).

Operation with hot brakes: Brakes will fully release at all times (hot brakes per brake temp monitor).

Figure 3:
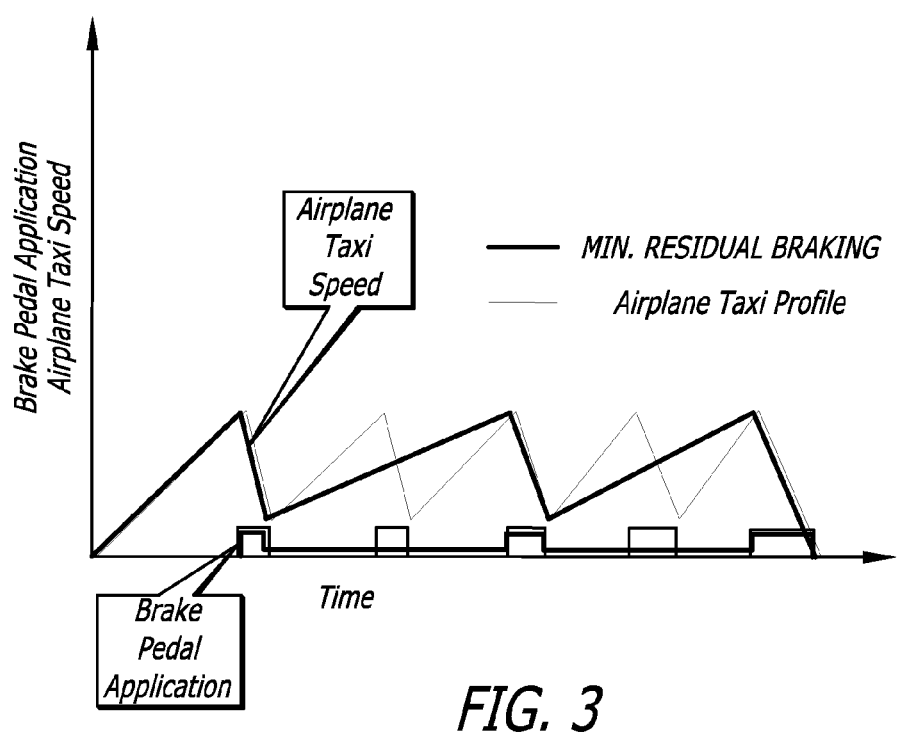
FIG. 3 is a schematic diagram of a system for controlling first and second pairs of electric brake actuators of an electric brake of FIG. 1, according to the present invention.

As is illustrated in FIG. 3, the overall brake energy for normal braking with multiple brake snubs is substantially equivalent to controlling application of aircraft carbon brakes according to the invention, but the number of taxi brake applications is reduced from five brake applications using normal braking, to one braking application by the method of the invention. The number of taxi brake applications thus can be substantially reduced by the method of the invention, resulting in significantly reduced aircraft carbon brake wear.

Figure 4:
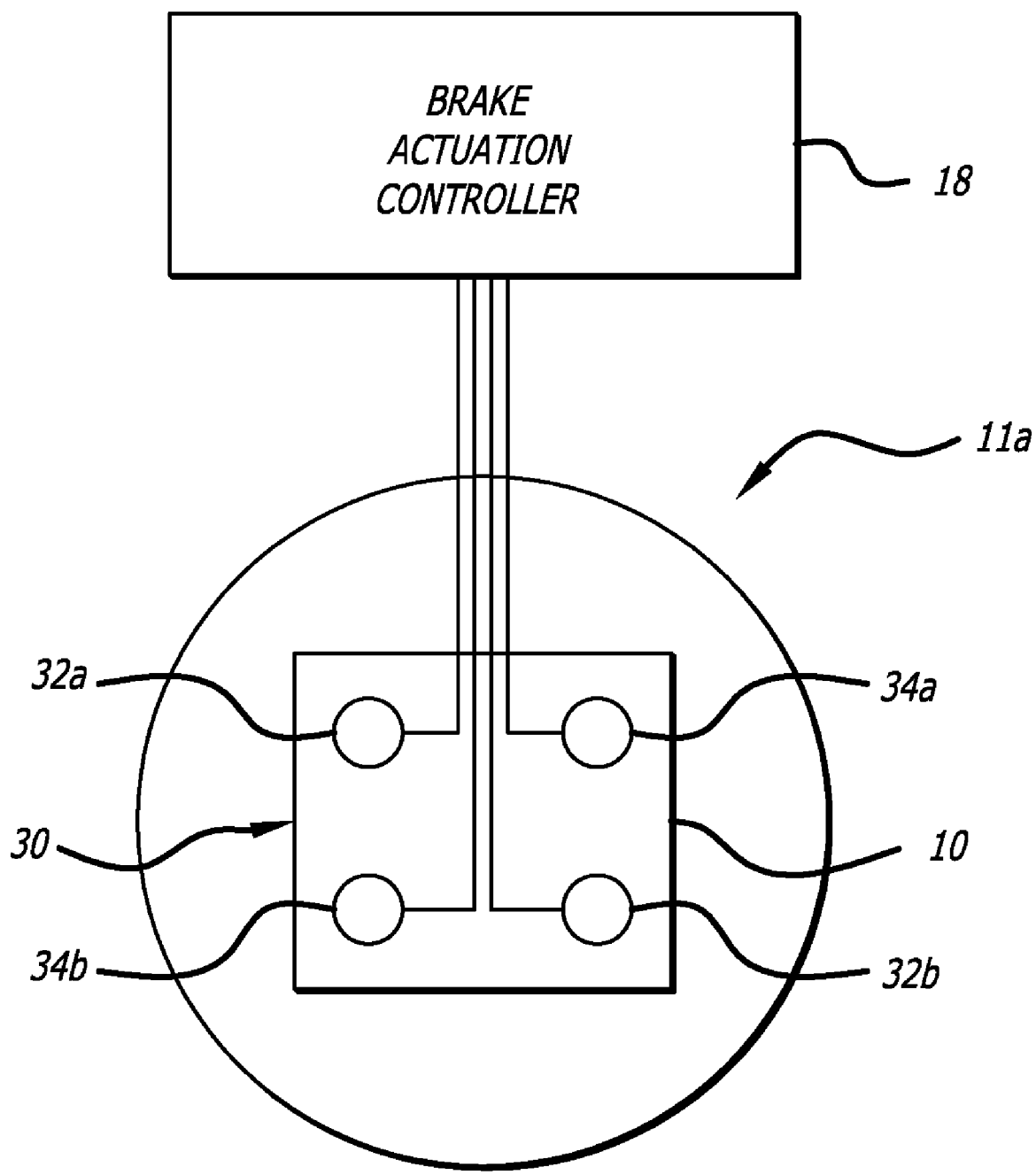
FIG. 4 is a schematic diagram of the system for increasing brake clamping force accuracy according to the present invention.

As is illustrated in FIG. 4, in the method and system of the invention, each individual brake 10 is provided with a plurality of electric brake actuators 30, consisting of a first portion of electric brake actuators, such as a first pair of electric brake actuators 32a, 32b, having a first range of low brake clamping force responsive to low brake clamping force commands, and a second portion of electric brake actuators, such as a second pair of electric brake actuators 34a, 34b, having a second range of high brake clamping force responsive to high brake clamping force commands. The first and second pairs of electric brake actuators are connected to the brake actuation controller 18, and in a preferred aspect, the first and second pairs of electric brake actuators are arranged in a balanced configuration in the brake, such as with the first pair of electric brake actuators 32a, 32b placed in radially opposing positions in the brake, and the second pair of electric brake actuators 34a, 34b similarly placed in radially opposing positions in the brake. In a presently preferred aspect, the second pair of electric brake actuators are placed between the first pair of electric brake actuators, and the second pair of electric brake actuators are typically placed symmetrically between the first pair of electric brake actuators.

In the method according to the invention, once the residual minimum brake clamping force is engaged, it is maintained for the plurality of wheel brakes despite a commanded release of braking, such as by actuation of brake pedal by a pilot, an autobrake system, or gear-up braking system, for example, of any of the plurality of wheel brakes. In a preferred aspect, the first pair of electric brake actuators 32a, 32b, is actuated to maintain the predetermined minimum residual brake clamping force until one or more control logic conditions occurs, in response to which the application of the predetermined minimum residual brake clamping force is discontinued, and the second pair of electric brake actuators 34a, 34b, is engaged only when the braking force to be applied falls within the second range of high brake clamping force. When the commanded braking force falls below the second range of high brake clamping force, the second pair of electric brake actuators is disengaged. The cumulative range of clamping force of the first and second pairs of electric brake actuators is equivalent to that of current electric brake actuators, but because the entire range is divided between the first and second portions of electric brake actuators, and the accuracy of the first portion of low force electric brake actuators applies over a smaller range, the cumulative brake force of the first and second portions of electric brake actuators is significantly improved, particularly at low speeds, when steering of the aircraft is commonly controlled by braking, and particularly when a minimum light residual clamping brake force is maintained during taxiing when braking is no longer commanded.

The invention claimed is:

1. In a method for controlling electric aircraft carbon brakes of an aircraft having a plurality of wheels and a corresponding plurality of wheel brakes when the aircraft is taxiing, the method including the step of providing a plurality of brake actuators of each wheel brake with brake clamping force commands, the improvement in the method comprising:

providing a first portion of the plurality of electric brake actuators of each wheel brake with a first range of low brake clamping force responsive to low brake clamping force commands, and a second portion of the plurality of electric brake actuators of each brake with a second range of high brake clamping force responsive to high brake clamping force commands;

monitoring commanded initiation of braking of any of the plurality of wheel brakes of the aircraft;

setting a residual brake clamping force to a predetermined minimum residual brake clamping force for the plurality of wheel brakes in response to said commanded initiation of braking of any of the plurality of wheel brakes;

actuating said first portion of electric brake actuators to apply said predetermined minimum residual brake clamping force once wheel braking is commanded and maintaining said predetermined minimum residual brake clamping force despite a commanded release of braking of any of the plurality of wheel brakes;

discontinuing applying said predetermined minimum residual brake clamping force in response to at least one control logic condition;

determining an average wheel speed; and comparing said average wheel speed with a predetermined wheel speed threshold, and wherein said at least one control logic condition comprises said average wheel speed being below said predetermined wheel speed threshold.

2. The method of claim 1, further comprising the step of actuating said second portion of electric brake actuators only when the commanded braking force is in the second high range of brake clamping force.

3. The method of claim 1, wherein said aircraft has left and right landing gear, and said step of determining an average wheel speed comprises determining an average wheel speed of the left landing gear and an average wheel speed of the right landing independently, comparing said average wheel speeds of the left and right landing gear, and comparing the lesser of the average wheel speeds of the left and right landing gear with said predetermined wheel speed threshold.

4. The method of claim 1, further comprising the step of detecting wheel speed acceleration, and comparing said wheel speed acceleration with a predetermined acceleration threshold, and wherein said at least one control logic condition comprises said wheel speed acceleration exceeding said acceleration threshold.

5. The method of claim 1, further comprising monitoring temperature of said plurality of wheel brakes, and comparing said temperature of said plurality of wheel brakes with a temperature threshold, and wherein said at least one control logic condition comprises said temperature of said plurality of wheel brakes exceeding said temperature threshold.

6. The method of claim 1, further comprising determining distance rolled with said predetermined minimum residual brake clamping force applied, comparing said distance rolled with a predetermined distance threshold, and wherein said at least one control logic condition comprises said distance rolled exceeding said predetermined distance threshold.

7. In a method for controlling electric aircraft carbon brakes of an aircraft having a plurality of wheels and a corresponding plurality of wheel brakes when the aircraft is taxiing, and the aircraft having at least one engine thrust lever, the method including the step of providing a plurality of brake actuators of each wheel brake with brake clamping force commands, the improvement in the method comprising;

providing a first portion of the plurality of electric brake actuators of each wheel brake with a first range of low brake clamping force responsive to low brake clamping force commands, and a second portion of the plurality of electric brake actuators of each brake with a second range of high brake clamping force responsive to high brake clamping force commands;

monitoring commanded initiation of braking of any of the plurality of wheel brakes of the aircraft;

setting a residual brake clamping force to a predetermined minimum residual brake clamping force for the plurality of wheel brakes in response to said commanded initiation of braking of any of the plurality of wheel brakes;

actuating said first portion of electric brake actuators to apply said predetermined minimum residual brake clamping force once wheel braking is commanded and maintaining said predetermined minimum residual brake clamping force despite a commanded release of braking of any of the plurality of wheel brakes;

monitoring engine thrust lever position; and discontinuing applying said predetermined minimum residual brake clamping force in response to at least one control logic condition, and wherein said at least one control logic condition comprises said at least one engine thrust lever being in an advanced position.

8. The method of claim 7, further comprising the step of detecting wheel speed acceleration, and comparing said wheel speed acceleration with a predetermined acceleration threshold, and wherein said at least one control logic condition comprises said wheel speed acceleration exceeding said acceleration threshold.

9. The method of claim 7, further comprising monitoring temperature of said plurality of wheel brakes, and comparing said temperature of said plurality of wheel brakes with a temperature threshold, and wherein said at least one control logic condition comprises said temperature of said plurality of wheel brakes exceeding said temperature threshold.

10. The method of claim 7, further comprising determining distance rolled with said predetermined minimum residual brake clamping force applied, and comparing said distance rolled with a predetermined distance threshold, and wherein said at least one control logic condition comprises said distance rolled exceeding said predetermined distance threshold.

11. In a system for increasing accuracy of clamping force of electric aircraft carbon brakes of an aircraft having a plurality of wheels and a corresponding plurality of wheel brakes for the plurality of wheels to reduce brake wear when the aircraft is taxiing, the system including a plurality of brake actuators of each wheel brake, the improvement in the system comprising:

a first portion of a plurality of electric brake actuators of each brake having a first range of low brake clamping force responsive to low brake clamping force commands;

a second portion of a plurality of electric brake actuators of each brake having a second range of high brake clamping force responsive to high brake clamping force commands;

means for monitoring commanded initiation of braking of any of the plurality of wheel brakes of the aircraft;

means for setting a residual brake clamping force to a predetermined minimum residual brake clamping force for the plurality of wheel brakes in response to said commanded initiation of braking of any of the plurality of wheel brakes; and means for actuating said first portion of electric brake actuators to apply said predetermined minimum residual brake clamping force once wheel braking is commanded and maintaining said predetermined minimum residual brake clamping force despite a commanded release of braking of any of the plurality of wheel brakes;

means for discontinuing applying said predetermined minimum residual brake clamping force in response to at least one control logic condition; and means for determining an average wheel speed and comparing said average wheel speed with a predetermined wheel speed threshold, and wherein said at least one control logic condition comprises said average wheel speed being below said predetermined wheel speed threshold.

12. The system of claim 11, further comprising means for actuating said second portion of electric brake actuators only when the commanded braking force is in the second high range of brake clamping force.

13. The system of claim 11, further comprising means for detecting wheel speed acceleration, and means for comparing said wheel speed acceleration with a predetermined acceleration threshold, and wherein said at least one control logic condition comprises said wheel speed acceleration exceeding said acceleration threshold.

14. The system of claim 11, further comprising means for monitoring temperature of said plurality of wheel brakes, and means for comparing said temperature of said plurality of wheel brakes with a temperature threshold, and wherein said at least one control logic condition comprises said temperature of said plurality of wheel brakes exceeding said temperature threshold.

15. The system of claim 11, further comprising means for determining distance rolled with said predetermined minimum residual brake clamping force applied, and means for comparing said distance rolled with a predetermined distance threshold, and wherein said at least one control logic condition comprises said distance rolled exceeding said predetermined distance threshold.

* * * * *